United States Patent
Mohajer et al.

(10) Patent No.: US 11,250,217 B1
(45) Date of Patent: Feb. 15, 2022

(54) CONDITIONAL RESPONSES TO APPLICATION COMMANDS IN A CLIENT-SERVER SYSTEM

(71) Applicant: SoundHound, Inc., Santa Clara, CA (US)

(72) Inventors: Keyvan Mohajer, Los Gatos, CA (US); Christopher S. Wilson, Sunnyvale, CA (US); Kheng Khov, Santa Clara, CA (US); Ian Graves, Santa Clara, CA (US)

(73) Assignee: SoundHound, Inc., Santa Clara, CA (US)

( * ) Notice: Subject to any disclaimer, the term of this patent is extended or adjusted under 35 U.S.C. 154(b) by 57 days.

(21) Appl. No.: 16/791,421

(22) Filed: Feb. 14, 2020

Related U.S. Application Data

(63) Continuation of application No. 16/550,174, filed on Aug. 24, 2019, now abandoned, which is a (Continued)

(51) Int. Cl.
  *G06F 40/30* (2020.01)
  *H04L 29/08* (2006.01)

(52) U.S. Cl.
  CPC .............. *G06F 40/30* (2020.01); *H04L 67/10* (2013.01)

(58) Field of Classification Search
  CPC .................. G06F 40/30; H04L 67/10
  (Continued)

(56) References Cited

U.S. PATENT DOCUMENTS 6,523,061 B1 * 2/2003 Halverson ............... G06F 9/465
  709/202
7,230,731 B2   6/2007 Dan et al.
(Continued)

FOREIGN PATENT DOCUMENTS

WO   WO 2013/137660 A1   9/2013

OTHER PUBLICATIONS

"About Siri," Apple Inc., Last Modified Apr. 15, 2015, 13 pages, [Online] May be retrieved at<URL:https://support.apple.com/en-ap/HT204389>.
(Continued)

*Primary Examiner* — Akwasi M Sarpong
(74) *Attorney, Agent, or Firm* — Fenwick & West LLP

(57) ABSTRACT

A client device receives a user request (e.g., in natural language form) to execute a command of an application. The client device delegates interpretation of the request to a response-processing server. Using domain knowledge previously provided by a developer of the application, the response-processing server determines the various possible responses that client devices could make in response to the request based on circumstances such as the capabilities of the client devices and the state of the application data. The response-processing server accordingly generates a response package that describes a number of different conditional responses that client devices could have to the request and provides the response package to the client device. The client device selects the appropriate response from the response package based on the circumstances as determined by the client device, executes the command (if possible), and provides the user with some representation of the response.

16 Claims, 6 Drawing Sheets

Related U.S. Application Data continuation of application No. 14/799,382, filed on Jul. 14, 2015, now abandoned.

(58) Field of Classification Search
USPC .......................... 704/235, 260, 14.53, 231
See application file for complete search history.

(56) References Cited

U.S. PATENT DOCUMENTS

| | | | |
|---|---|---|---|
| 7,376,645 B2 | 5/2008 | Bernard | |
| 7,619,764 B2 | 11/2009 | Fukunaga et al. | |
| 7,873,654 B2 * | 1/2011 | Bernard | G06F 16/3329 |
| | | | 707/769 |
| 8,150,872 B2 | 4/2012 | Bernard | |
| 8,199,170 B2 | 6/2012 | Mishima | |
| 8,370,146 B1 * | 2/2013 | Schalkwyk | G10L 15/1815 |
| | | | 704/255 |
| 8,694,537 B2 | 4/2014 | Mohajer | |
| 8,983,858 B2 * | 3/2015 | Evans | G06Q 30/02 |
| | | | 705/14.53 |
| 8,996,376 B2 * | 3/2015 | Fleizach | G10L 13/00 |
| | | | 704/260 |
| 9,043,204 B2 * | 5/2015 | Berens | G10L 15/22 |
| | | | 704/235 |
| 9,043,278 B1 * | 5/2015 | Wilson | G06F 16/27 |
| | | | 707/626 |
| 9,053,089 B2 * | 6/2015 | Bellegarda | G06F 40/284 |
| 9,071,855 B1 * | 6/2015 | Casey | H04N 21/4826 |
| 9,134,952 B2 * | 9/2015 | Yi | G06F 3/165 |
| 9,582,467 B2 * | 2/2017 | Suma | G06F 16/258 |
| 9,891,907 B2 * | 2/2018 | Searle | H04L 63/10 |
| 9,912,494 B2 * | 3/2018 | Nethi | H04L 12/2836 |
| 9,921,665 B2 * | 3/2018 | Scott | G06F 16/3322 |
| 9,953,378 B2 * | 4/2018 | Purves | G06Q 30/0613 |
| 9,971,542 B2 * | 5/2018 | Frank | G06F 3/061 |
| 2002/0032900 A1 * | 3/2002 | Charisius | G06F 8/20 |
| | | | 717/106 |
| 2002/0133544 A1 | 9/2002 | Aoike et al. | |
| 2002/0143529 A1 * | 10/2002 | Schmid | G10L 15/28 |
| | | | 704/231 |
| 2003/0005174 A1 * | 1/2003 | Coffman | G06F 9/542 |
| | | | 719/318 |
| 2003/0048464 A1 | 3/2003 | Yamada et al. | |
| 2003/0072023 A1 | 4/2003 | Tanaka | |
| 2003/0107756 A1 | 6/2003 | Dan et al. | |
| 2003/0142330 A1 | 7/2003 | Arakawa | |
| 2003/0217240 A1 | 11/2003 | Satomi et al. | |
| 2004/0021900 A1 | 2/2004 | Arakawa | |
| 2004/0024652 A1 * | 2/2004 | Buhse | G06Q 30/0635 |
| | | | 705/26.81 |
| 2004/0098292 A1 * | 5/2004 | Miller | G06Q 99/00 |
| | | | 709/224 |
| 2004/0139052 A1 | 7/2004 | Kazushige et al. | |
| 2004/0139119 A1 * | 7/2004 | Clark | H04L 67/303 |
| 2005/0195212 A1 | 9/2005 | Kurumisawa et al. | |
| 2005/0259280 A1 | 11/2005 | Rozzi | |
| 2006/0015897 A1 | 1/2006 | Kim | |
| 2006/0212906 A1 | 9/2006 | Cantalini | |
| 2007/0035614 A1 | 2/2007 | Tamaru et al. | |
| 2007/0081189 A1 | 4/2007 | Kamei et al. | |
| 2007/0124474 A1 | 5/2007 | Margulis | |
| 2007/0279656 A1 | 12/2007 | Yamauchi et al. | |
| 2008/0024592 A1 | 1/2008 | Bang et al. | |
| 2008/0238948 A1 | 10/2008 | Mishima | |
| 2008/0282172 A1 * | 11/2008 | Bayang | G06F 9/451 |
| | | | 715/744 |
| 2009/0024771 A1 | 1/2009 | Koike et al. | |
| 2009/0067805 A1 | 3/2009 | Kuroda et al. | |
| 2009/0210688 A1 | 8/2009 | Kohiga | |
| 2009/0251715 A1 | 10/2009 | Kita | |
| 2009/0300076 A1 * | 12/2009 | Friedman | G06F 11/3664 |
| 2010/0033748 A1 | 2/2010 | Enami et al. | |
| 2010/0231945 A1 | 9/2010 | Tanaka | |
| 2010/0277754 A1 | 11/2010 | Arimura et al. | |
| 2011/0307398 A1 * | 12/2011 | Reinhardt | G06Q 50/01 |
| | | | 705/319 |
| 2012/0016678 A1 * | 1/2012 | Gruber | G06F 16/9537 |
| | | | 704/275 |
| 2013/0127928 A1 | 5/2013 | Myers | |
| 2013/0132084 A1 * | 5/2013 | Stonehocker | G10L 15/30 |
| | | | 704/244 |
| 2013/0290203 A1 * | 10/2013 | Purves | G06F 16/972 |
| | | | 705/319 |
| 2013/0293587 A1 * | 11/2013 | SanGiovanni | G06T 3/40 |
| | | | 345/634 |
| 2013/0346302 A1 * | 12/2013 | Purves | G06Q 20/108 |
| | | | 705/40 |
| 2014/0095538 A1 * | 4/2014 | Stremel | G06Q 50/01 |
| | | | 707/770 |
| 2014/0095583 A1 * | 4/2014 | Houle | G06F 16/9577 |
| | | | 709/203 |
| 2014/0222433 A1 * | 8/2014 | Govrin | G06N 5/02 |
| | | | 704/260 |
| 2015/0066479 A1 * | 3/2015 | Pasupalak | G06F 40/40 |
| | | | 704/9 |
| 2015/0244883 A1 | 8/2015 | Tanaka | |
| 2016/0179464 A1 * | 6/2016 | Reddy | G06F 3/167 |
| | | | 715/728 |
| 2018/0144064 A1 * | 5/2018 | Krasadakis | G06F 40/295 |

OTHER PUBLICATIONS

"Firefox: Use the Java Plugin to View Interactive Content on Websites," Mozilla, 1993-2014,6 pages, [Online] May be retrieved at<URL:https://support.mozilla.org/en- US/kb/use-java-plugin-to-view-interactive-content#w enabling-java>.

"U.S. News Center: Samsung Introduces the Galaxy S III, the Smartphone Designed for Humans and Inspired by Nature," May 3, 2012, Samsung, 1995-2015, 15 pages, [Online] May be retrieved at<URL http://www.samsung.com/us/news/newsRead.do?news seq=20165>.

United States Office Action, U.S. Appl. No. 14/799,382, dated Mar. 27, 2019, 9 pages.

United States Office Action, U.S. Appl. No. 14/799,382, dated Oct. 12, 2018, 12 pages.

United States Office Action, U.S. Appl. No. 14/799,382, dated Jan. 22, 2018, 26 pages.

United States Office Action, U.S. Appl. No. 14/799,382, dated Sep. 20, 2017, 23 pages.

United States Office Action, U.S. Appl. No. 14/799,382, dated Mar. 30, 2017, 18 pages.

United States Office Action, U.S. Appl. No. 14/799,382, dated Oct. 7, 2016, 15 pages.

* cited by examiner

US 11,250,217 B1

CONDITIONAL RESPONSES TO APPLICATION COMMANDS IN A CLIENT-SERVER SYSTEM

RELATED APPLICATIONS

This application is a continuation of U.S. patent application Ser. No. 16/550,174, filed on Aug. 24, 2019, which is in turn a continuation of U.S. patent application Ser. No. 14/799,382, filed on Jul. 14, 2015, which is hereby incorporated by reference.

TECHNICAL FIELD

The disclosed embodiments relate generally to execution of applications distributed over a computer network, and more specifically, to server-based determination and provision of possible responses to requests for client devices.

BACKGROUND

Different types of client devices support different types and degrees of application functionality. For example, users may use their laptops or tablets in some contexts, their smartphones in other contexts, specialized devices (e.g., smart watches or intelligent appliances) in other contexts, and the like. The various client devices may delegate requests (e.g., in natural language form) for application functionality to a server. This delegation is useful in cases where the client device itself is not capable of interpreting the request and thus relies on the server to perform the interpretation and provide the client device with a more structured form of the request that will enable the client device to respond to the request. However, in many cases the server does not have knowledge of the functionality of the various client devices making the requests, and/or cannot realistically know all the possible responses of which the various devices are capable. In such cases, the server cannot with certainty predict which, of the many potential types of responses, the client device should give in response to the application request.

SUMMARY

A client device receives a user request to execute a command of an application. The application operates in a specific type of domain, such as calendaring/scheduling, email/communications, or the like. The request may be specified, for example, in natural language form (e.g., as text or voice). The client device packages the request into a message and transmits the message to a response-processing server to interpret. Using programmed code that represents domain knowledge of the application's domain, the response-processing server determines the various possible responses that client devices could make in response to the request based on, for example, the capabilities of the client devices and the state of the application data (e.g., whether particular referenced data exists or not). The response-processing server accordingly generates a response package that encodes a number of different conditional responses that client devices could have to the request based on the various possible circumstances and transmits the response package to the client device. The client device selects the appropriate response from the response package based on the circumstances as determined by the client device. Then, using data from the response package about the requested command, the client device executes the command (if possible), and provides the user with some representation of the response (e.g., written or spoken) as supported by the capabilities of the client device.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
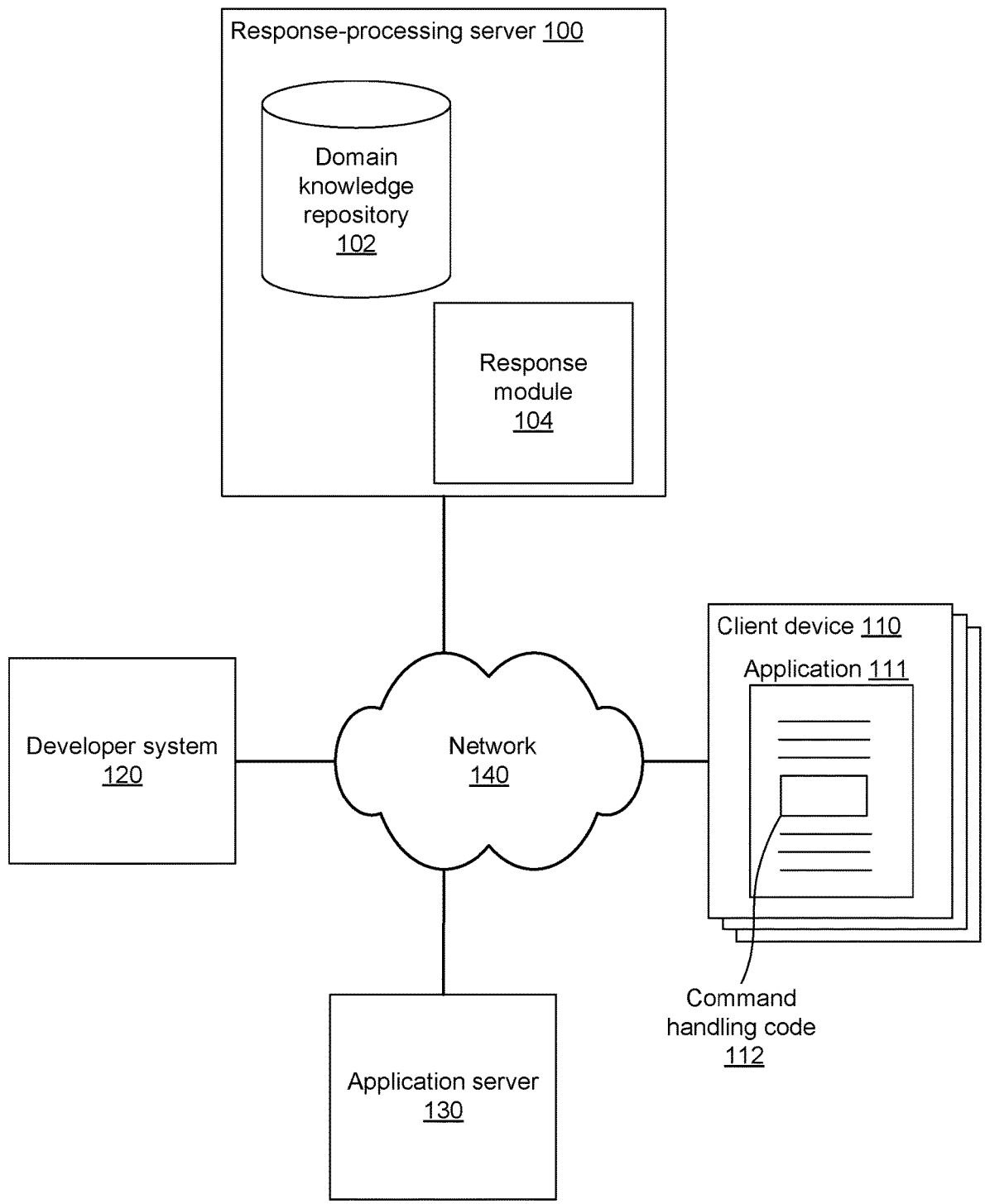
FIG. 1 shows a system environment in which command processing takes place, according to one embodiment.

FIG. 1 shows a system environment in which command processing takes place, according to one embodiment. Users of the client devices 110 use the client devices to specify requests for applications 111 executing partially or entirely on the client devices. The applications 111 are made up of executable computer code and implement functionality for one or more application domains, such as calendaring/scheduling, event reminders, email/voice or other communications, mapping, music players, and the like. The applications 111 can include both "back-end" code (e.g., creating a calendar item) and front-end processing code (e.g., interpreting a user natural language command to create a calendar item). The user command code may be authored by the same developer(s) that authored the "back-end" code, or a separate developer(s) may extend the user interface of an existing application by authoring new user command code that interprets user commands and implements them by calling the back-end code of the existing application (e.g., its application programming interface (API)) as appropriate for the given user command. The code of the application 111 made be entirely located on client devices 110, or it may be located on an application server 130, or it may be some combination thereof (e.g., a thin client application on the client device 110 that makes calls to an application server 130).

In cases where the applications 111 (or add-on software thereto) cannot themselves programmatically interpret the requests for the applications (e.g., when the requests are specified in a natural language, such as via a virtual assistant program that performs request interpretation on a server), the client devices delegate the processing of the request to a response-processing server 100 by creating a message that encodes the request and transmitting that message to the response-processing server 100. The response-processing server 100 parses or otherwise programmatically analyzes the request to determine the meaning of the request, and if the parsing/analysis indicates that the request represents a valid command for the application, the server generates a set of conditional responses. The set of conditional responses-hereinafter referred to as a "response package"-represents the various possible responses that the client device 110 could make in response to the command, depending on the circumstances. The response-processing server 100 provides the response package to the client device 110. The client device 110 selects and displays the appropriate response from the response package based on its own capabilities and/or on the state of the application data itself. If the requested functionality of the application 111 is implemented on an application server 130, rather than wholly by the local application 111, the client device 110 may also use data from the response package to make a request of the application server 130 to carry out the command.

Providing the client device 110 with the response package-which provides the set of possible responses-immediately allows the client device to quickly select the proper response. This greatly reduces the number of client-server interactions required to respond to the command request, and accordingly also simplifies the protocol logic that would be required to implement the different possible responses. For example, designing a protocol for canceling a meeting in a calendaring application would require more back-and-forth interactions between the client and the server, and hence would also require more complexity to design to account for the various states of the interactions. For instance, consider the user request "Cancel my meeting with Chris tomorrow at 2 pm". A conventional protocol using a single question/response at a time might result in the following multi-step dialog process:

a. Server asks client if it has calendar capabilities
b. Client answers server with Y or N (along with client ID and dialog state)
c. Server receives client's Y or N answers and current dialog state,
   i. In case of N answer, send a final response to the client
   ii. In case of Y answer, checks if a calendar is available for this user
      1. Client answers Y or N (with dialog state and user ID)
      2. Server receives Y or N answers and current dialog state,
         a. In case of N answer, has an final answer
         b. In case of Y, server further inquires if the user has a calendar entry matching the request (time, person)
            i. Client answers Y or N
               1 . . . . .

In contrast, the server creates a response package that includes a set of conditional responses, which enables the recipient client device 110 to programmatically select the appropriate response from the package without further network transmissions and the associated delays due to network traffic. Importantly, this also avoids the need to account for and track multiple of intermediate dialog states. (Multiple intermediate dialog states are represented at the various branches of the above decision tree. For example, each "Y(es)" or "N(o)" answer leads to two separate states, one reflecting the Yes answer, and the other the No answer. Each of these possibility would need to be reflected in the dialog logic and/or the state variables.)

In one embodiment, an application developer authors an application 111 on a developer system and makes it available (e.g., via an app store) to the client devices 110, which install it locally. In this embodiment, the application developer, having the domain knowledge for the application domain, additionally specifies a semantic grammar that defines a set of natural language expressions that it is able to interpret as valid commands to the application. Alternatively, as noted above, separate developers could extend the user interface of the application 111 by defining the semantic grammars for the application 111. Additional details of the semantic grammars of this embodiment are provided below with respect to FIG. 4.

Thus, the client devices 110 of FIG. 1 have one or more software applications 111 developed by a developer on the developer system 120 and made available to users. The application 111 includes command handling code 112 that responds to the receipt of a request from a user and delegates processing of the request to the response processing server. (In an embodiment in which separate developers develop the semantic grammars for defining a natural language user interface, the command-handling code 112 is not part of the application 111 itself, but rather supplements the application.) The request may be received by the command handling code 112 in different forms in different embodiments, such as natural language (either as speech or text), designations of user interface components, or the like.

The request is processed by the response module 104 of the response processing server 100. The response-processing server 100 includes a domain knowledge repository 102 that enables the response module 104 to provide the response package that is appropriate for the particular application and command. In one embodiment, the domain knowledge repository 102 is implemented wholly or in part by semantic grammars that define a set of natural language expressions that are valid commands, as well as a set of corresponding actions that assemble the appropriate response package. The response module 104 is specially programmed code that is not available in a generic computer system, and implements the algorithms described herein. As will be apparent from the following discussion, the algorithms and processes described herein require implementation on a computer system, and are not performed by humans using mental steps.

The response processing server 100, client device 110, and developer system are connected by a network 140. The network 140 may be any suitable communications network for data transmission. In one embodiment, the network 140 is the Internet and uses standard communications technologies and/or protocols.

Figure 2:
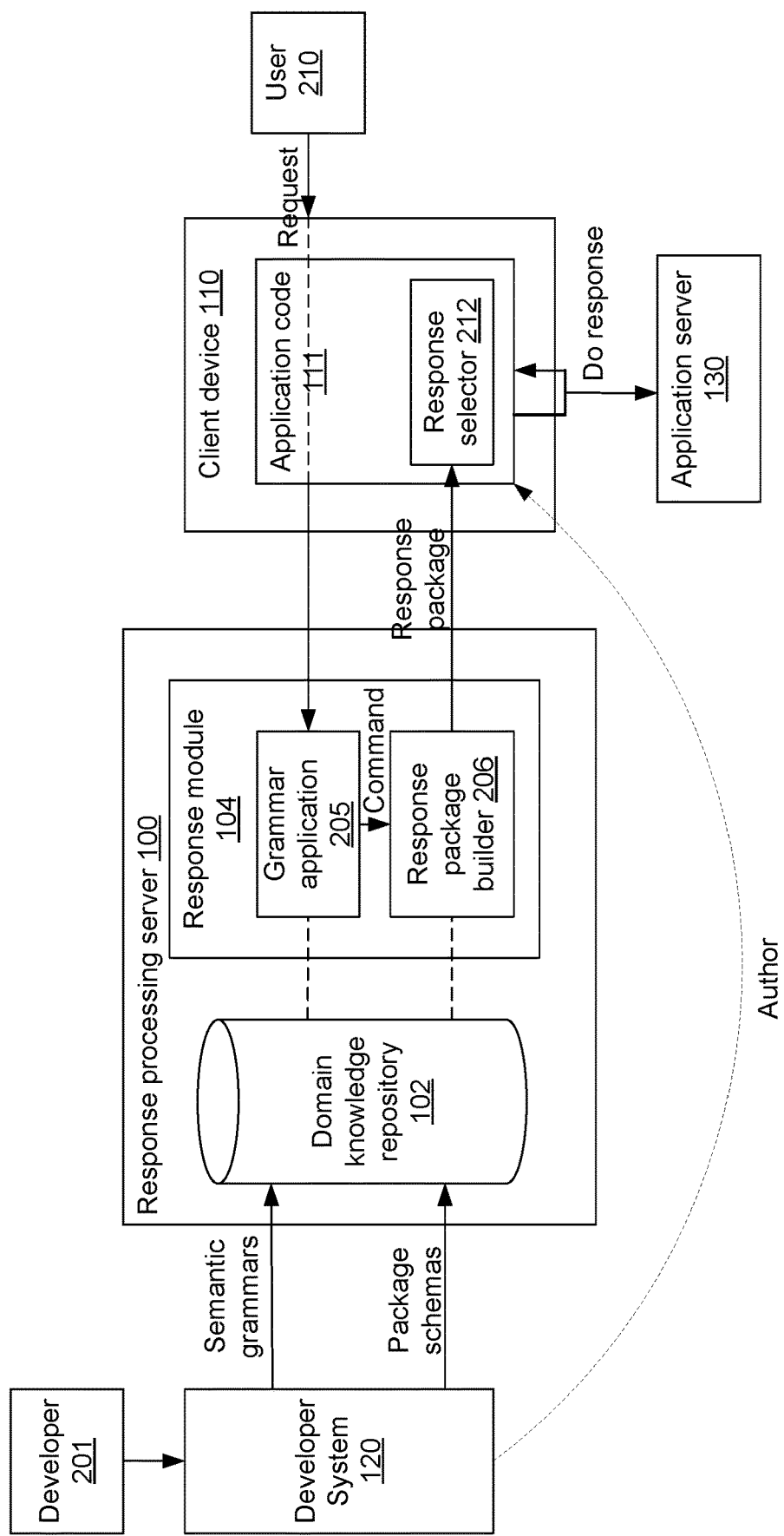
FIG. 2 is a data flow diagram illustrating interactions of the response processing server, a developer, the developer system, the client device, a user, and an application server, according to one embodiment

FIG. 2 is a data flow diagram illustrating interactions of the response processing server 100, a developer 201, the developer system 120, the client device 110, a user 210, and an application server 130, according to one embodiment. Initially, a developer 201 provides a software application 111 via a developer host system 120. The developer's application 111 is configured to receive requests to execute commands, e.g., specified in natural language form, from users 210. (The ability to receive and execute commands may be provided directly by the developer(s) 201 that developed the application 111, or by separate developers that author command-handling code that then conceptually forms part of the original application 111.) Each application 111, and each distinct command within the application, may have different possible responses when executed by the different client devices 110 that execute the application 111. For example, assume that one particular application 111 is a calendar application allowing a user to make appointments by sending appointment creation messages to an application server 130 storing and controlling access to the actual calendar data. If a user specified (e.g., via speech input) the request "Cancel my meeting with Chris tomorrow at 2 pm" on his laptop, the laptop might contain sufficient application 111 logic to implement the deletion of the desired appointment (e.g., by sending a message to the application server 130 in the format required by the portion of the application 111 executing on the application server 130), assuming that such an appointment existed. In contrast, if the user specified the same request on a smart appliance (e.g., by speaking to a smart television), the smart appliance might lack sufficient application 111 logic to implement the creation of the appointment. Thus, in the example of the laptop, the appropriate response by the laptop might be to send the properly-formatted calendar appointment deletion request to the application server 130 and to display the message "Appointment deleted" within a user interface of the laptop. (If the calendar appointment in question does not exist, the proper response might be to note that the appointment does not existing and to display the message "Error: No such appointment.") In the example of the smart appliance, the proper response might be for the smart appliance to determine that it lacks the logic to handle appointment requests and to display or speak the response, "Error: Can't handle appointment requests."

The response-processing server 100 may be used to interpret many different command requests from many different client devices 110 on behalf of many different applications 111. In order to better allow the response-processing server 100 to be able to interpret all of these different requests, in one embodiment each application developer 201 provides the response-processing server 100 with semantic grammars (described in more detail below with respect to FIG. 4) that define corresponding sets of natural language expressions that constitute valid commands, as well as actions to take in response to successfully parsing the commands, such as code to generate the appropriate response package to provide to the client device. As noted above, the semantic grammars may also be defined by other developers, separate from those that developed the application 111, as a way to extend the user interface capabilities of the application (e.g., by adding natural language commands).

Similarly, in one embodiment the developer 201 (or whichever developer provides the semantic grammars) also provides a set of response schemas to the response processing server 100. The response schemas, together with the semantic grammars, make up the domain knowledge repository 102, in that they enable the response-processing server 100 to identify valid commands and to generate the appropriate corresponding response packages. The response schemas describe the format of the response package for corresponding application commands. In one embodiment, the schemas have at least: a type that identifies the type of command to which the conditional responses of the response package correspond; the set of conditional responses themselves containing at least one default response, each response having at least one textual message that represents that particular response; and any needed command parameter values for implementing the command, assuming that the client device 110 supports the command. The command parameter values are derived from the command request and make it simpler for the client device 110 to execute the requested command, such as the value "14" (representing 2 PM) derived from the command request "Cancel my meeting with Chris tomorrow at 2 pm". In some embodiments, the response package includes a required features descriptor that indicates capabilities that the client device 110 must have in order to execute the command. In some embodiments, the response package additionally contains an ordered list of view types (e.g., "Native", or "None") that specify the ways in which the response should be displayed, with the highest-ordered view type being used if the client device 110 and/or the application 111 supports it, the next-highest if the client device 110 and/or the application 111 do not support the highest-ordered (but supports the next-highest-ordered), and so on. A value of "Native" (or an equivalent thereof), for example, indicates that the response should be rendered in a native graphical user interface of the application; a value of "None" (or an equivalent thereof) indicates that the response should be simply displayed in a text field of the client device 110 (e.g., a general-purpose text area on a smart appliance, where an application 111 might lack a native graphical user interface).

In some embodiments, each response of the set of different possible responses specified by the response package may contain an optional output state indicator that indicates a state that the application will be in after the response is provided, as well as an optional input state for the response to be applicable. For example, for a response package corresponding to a user request for a "set alarm" command, an "initiate alarm set" response from the response package might have an associated output state indicator indicating that the application 111 is now in the state of waiting for the user to specify a time for the alarm, and an "alarm successfully set" response might have an associated input state requiring that the application 111 be in the "initiate alarm set" state before it can be selected.

Listing 1 below provides an excerpt of one specific example of a response package specified in the JSON data interchange format in response to the command request "Cancel my meeting with Chris tomorrow at 2 pm", a more complete listing of which is provided in Appendix 1. Appendices 2-4 provide examples of response packages for other command requests. In one embodiment, each command-response package has a corresponding schema. The schemas may be specified as being derived from each other; for example, there may be a base schema for a generic response package that simply indicates that the command is not supported (supplied, e.g., by the response-processing server 100), and application developers may inherit from the base schema and add application-specific information.

Listing 1

```
{
    "CommandKind": "CalendarCommand",
    "SpokenResponse": "Canceling a calendar item is not supported by this client.",
    "WrittenResponse": "Canceling a calendar item is not supported by this client.",
    "ViewType":
        "Native",
        "None"
    ],
    "ClientActionSucceededResult": {
        "SpokenResponse": "I've canceled that item on your calendar.",
        "WrittenResponse": "I've canceled that item on your calendar."
    },
    "ClientActionFailedResult": {
        "SpokenResponse": "That calendar item cancelation could not be made.",
        "WrittenResponse": "That calendar item cancelation could not be made.",
    },
```

-continued

Listing 1

```
"CalendarCommandKind": "CancelItem",
"Query": {
    "SelectionTarget": "First",
    "RecurringTarget": "SpecifiedOnly",
    "ItemType": "Meeting",
    "StartTimeRange": {
        "RangeStart": {
            "Date": {
                "Symbolic": "unknown"
            },
            "Time": {
                "Hour": 14,
                "AmPmUnknown": false,
                "Minute": 0,
                "Second": 0
            }
        }
        "RangeEnd": {
            "Date": {
                "Symbolic": "unknown"
            },
            "Time": {
                "Hour": 14,
                "AmPmUnknown": false,
                "Minute": 0,
                "Second": 0
            }
        }
    }
},
"CalendarPreferenceIsNotSetResult": {
    "SpokenResponse": "Calendar items cannot currently be canceled because no preferred calendar has been chosen.",
    "WrittenResponse": "Calendar items cannot currently be canceled because no preferred calendar has been chosen.",
},
"NoMatchResult": {
    "SpokenResponse": "No matching calendar item was found.",
    "WrittenResponse": "No matching calendar item was found.",
}
```

The response package of Listing 1 above specifies that the command type ("CommandKind") is "CalendarCommand". The response package also specifies at spoken and a written response corresponding to various conditional responses; these values indicate text for the client device 110 to either speak using text to speech conversion or to display textually within a user interface of the client device, respectively. For example, the response package includes a default conditional response (corresponding to the "SpokenResponse" and "WrittenResponse" in the second and third top-level items) to be used when the client device 110 does not support the feature at all; a "ClientActionFailedResult" conditional response that is used when the calendar cancellation command is successful; a "ClientActionFailedResult" conditional response that is used when the calendar cancellation command fails; a "CalendarPreferenceIsNotSetResult" conditional response that is used when no specific preferred calendar has been chosen yet; and a "NoMatchResult" that is used when no matching calendar item (e.g., an item with "Chris" at time "tomorrow at 2 pm") can be found on the calendar. The response package also includes a descriptor of the specific command ("CancelItem", the value of the "CalendarCommandKind" field), and command parameter values that the client can use to carry out the command (namely, the data in the hash corresponding to the "Query" field, such as the value "14" for the field "Hour", indicating 2 PM). The response package of Listing 1 additionally contains a view type field (indicated by the "ViewType" field name) containing the ordered values "Native" and "None", indicating that the responses, if displayed textually, should preferably be rendered graphically in a native user interface, and failing that, the "WrittenResponse" field of the appropriate response should simply be displayed in a default text area of a user interface.

Figure 3:
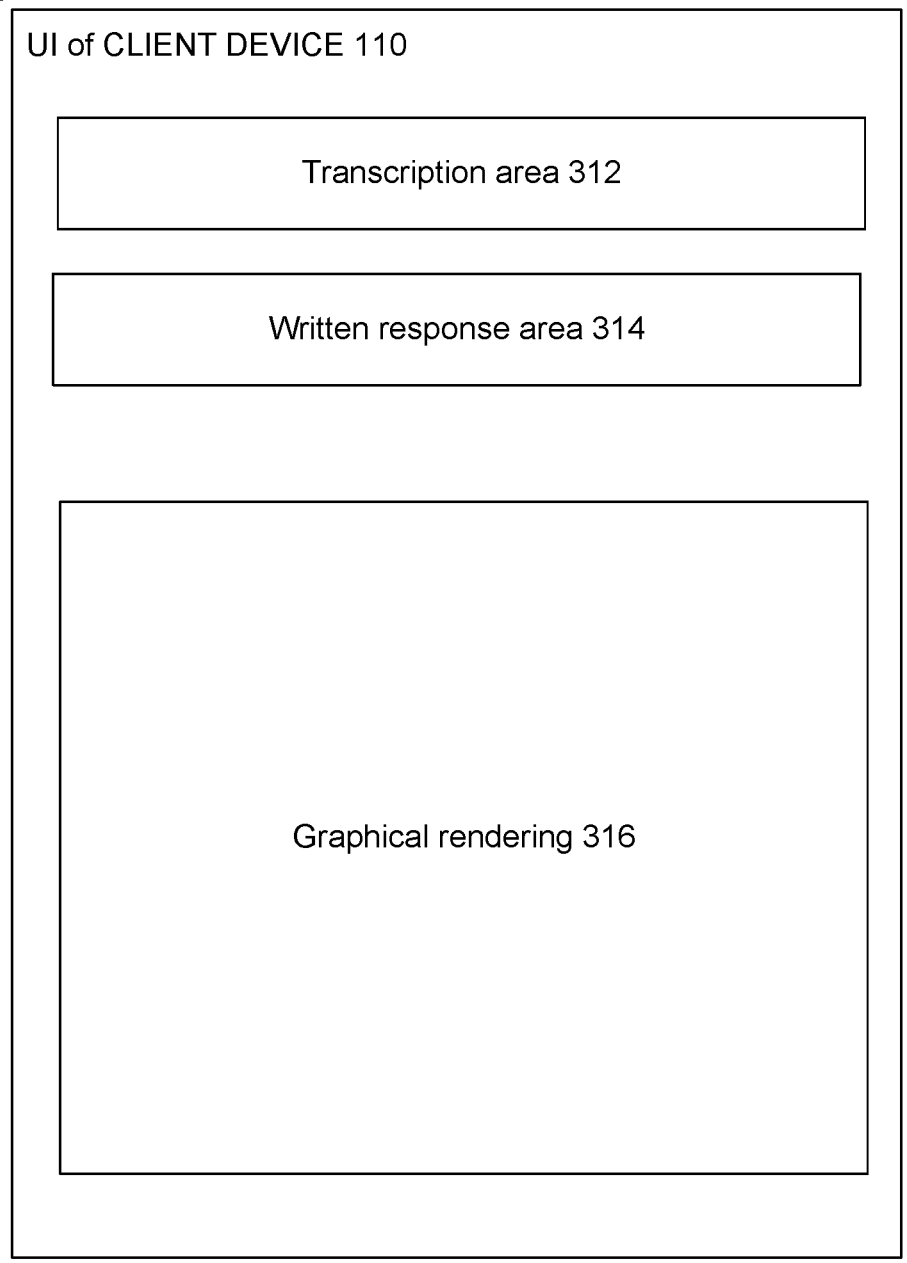
FIG. 3 illustrates a set of graphical regions that for most client devices serve as a baseline user interface.

FIG. 3 illustrates a set of graphical regions that for most client devices 110 serve as a baseline user interface 300. The user interface 300 includes a transcription text area 312 in which the application 111 of the client device 110 presents a textual version of a user command request, assuming that the user command request was initially given in the form of speech. The user interface 300 also includes a written response area 314 in which the application 111 of the client device 110 displays a textual version of the response, such as the value of the "WrittenResponse" field discussed above. The user interface also includes a graphical rendering area 316 in which the application 111 of the client device 110 displays a richer graphical rendering of a result of executing the command, such as a portion of the application data that was implicated by the command. For example, in the case of the above example command "Cancel my meeting with Chris tomorrow at 2 pm", the application 111 might display a graphical view of a portion of the user's calendar including the time representing "tomorrow at 2 pm", showing that the meeting was canceled, as well as any other calendar appointments around that time that are still scheduled.

The example user interface 300 may include different user interface portions on different client devices 110. For example, a client device 110 on which the command request is entered as text may omit the transcription area 312. As another example, less full-featured devices, such as a smart appliance, might not include graphical rendering capabilities and thus might omit the graphical rendering area 316.

Returning again to FIG. 2, the response-processing server 100 includes a response module 104 that processes user command requests and generates the appropriate response package. The response module 104 includes a grammar application module 205 that applies the semantic grammar that is appropriate for the given command request. The response module 104 also includes a response package builder module 206, which generates the appropriate response package for the given command request. (In one embodiment, the grammar application module 205 is implemented by parsing logic 402, described below in more detail with respect to FIG. 4. In one embodiment, the package builder module 206 is implemented by action code specified by the applied semantic grammar, as described in more detail below with respect to the actions 408B of FIG. 4.) The response module 104 can then provide the response package to the client device 110.

Given the response package, a response selector 212 of the application code 111 executing on the client device 110 then selects the response that is appropriate given the circumstances. (In cases where the semantic grammars and schemas are authored by a separate developer, other than the developer of the original application 111, the separate developer also authors the response selector 212, and in these cases the response selector may be considered external to the application 111 itself.) The relevant circumstances include the capabilities of the client device 110 itself (e.g., whether the application code is configured to handle the particular type of command, as indicated by the "CommandKind" field of the response package) and the state of the application data (e.g., whether data for a specified appointment does in fact exist, as in the above example). The application code 111 may perform actions such as speaking the response text of the selected response (e.g., the value of the "SpokenResponse" field described above), displaying the response text of the selected response (e.g., the value of the "WrittenResponse" field) in the written response area 314 of FIG. 3, and/or executing the command in the application 111. The execution of the command may use values specified within the response, e.g., values within the value of the "Query" field of Listing 1. The execution of the command may involve only local actions within the client device 110, or—if the application 111 is implemented in part using a remote application server 130—may involve sending a request to the application server 130 in the format required by the application server, e.g., to delete a calendar item as in the above example.

Figure 4:
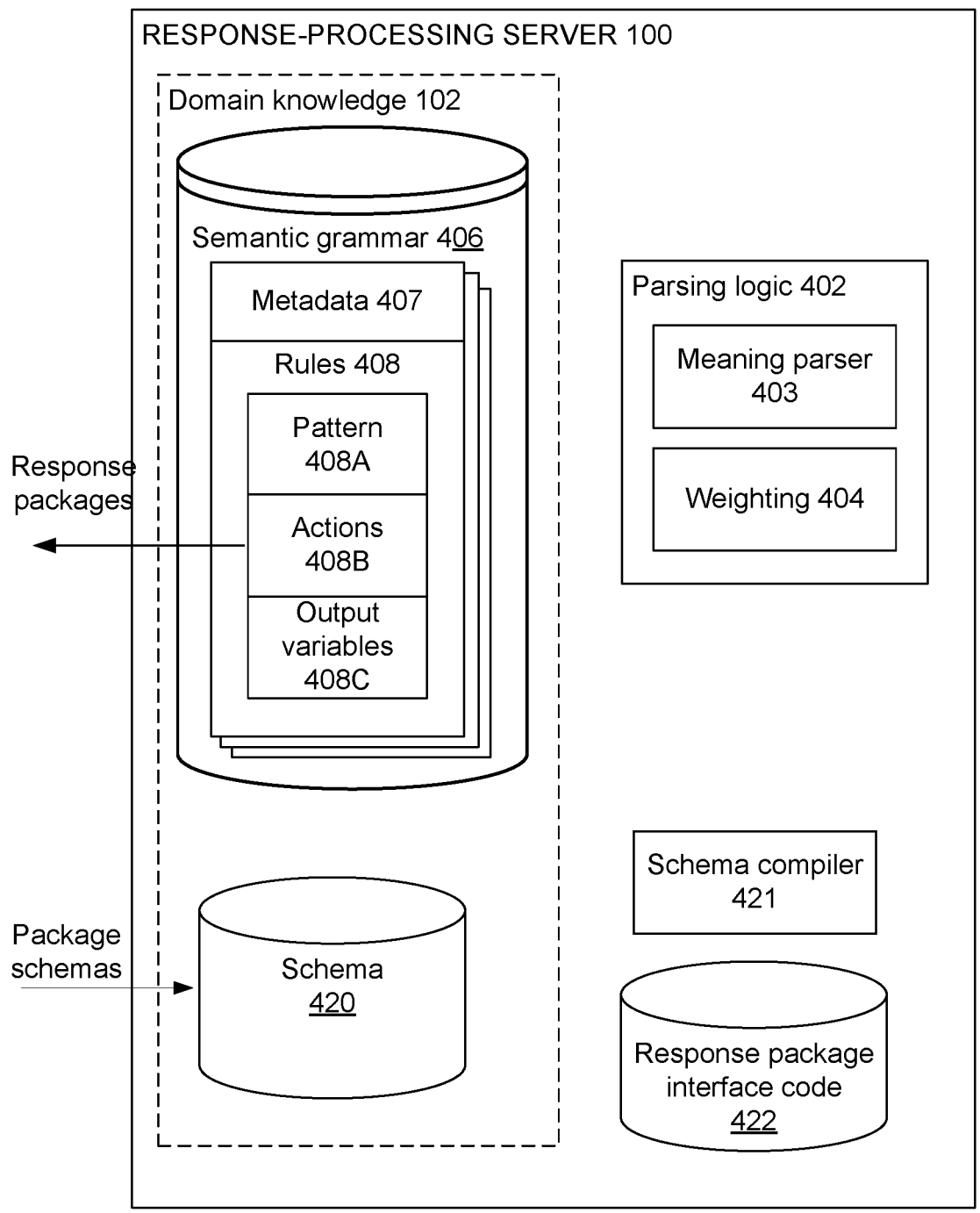
FIG. 4 illustrates in more detail the components of the response-processing server of FIGS. 1 and 2, according to one embodiment.

FIG. 4 illustrates in more detail the components of the response-processing server 100 of FIGS. 1 and 2, according to one embodiment. As can be appreciated by one of skill in the art, the configuration of the logic and data of the response-processing server 100 results in a particular, non-generic computer system that is specifically structured to perform the functions described herein.

The response-processing server 100 stores domain knowledge data 102, which includes a set of semantic grammars 406. Each semantic grammar 406 implicitly defines a set of natural language expressions (hereinafter "expressions") that it is able to parse and interpret, such as commands requesting the creation or modification of calendar appointments, commands that set alarms, and the like. The semantic grammars 406 are typically submitted by the various developers 201 of the applications 111, although it is possible for the semantic grammars to be submitted by other parties as well, such as the entity responsible for the response-processing server 100.

Each semantic grammar 406 has associated metadata 407, such as a name, a description, an author, and/or a date of submission. It also has one or more rules 408 defined in a programming language. Each semantic grammar rule 408 defines: a pattern 408A for the natural language expressions that the semantic grammar 406 can parse (for example, a natural language expression that specifies a date or a range of dates); optionally empty programming actions 408B that may include semantic constraints, and that specify the construction of an interpretation or meaning (e.g., by assigning values to output variables based on a natural language request that the semantic grammar interprets); and output variables 408C that represent the meaning of the natural language request, as discussed below.

A semantic grammar 406 is said to be able to interpret a natural language request if the request can be successfully parsed according to the pattern 408A of one of the rules 408 of the semantic grammar 406, and the semantic constraints (if any) defined by the corresponding actions 408B are all satisfied; the meaning representation of the expression is then defined by the output variables 408C of the rule 408.

If a natural language expression (or entire request) can be successfully parsed and interpreted by a given semantic grammar 406, the interpretation yields an associated meaning defined by values of the output variables 408C, and (in embodiments that have a weighting module 404, as described below) an associated strength measure. If a natural language expression cannot be successfully interpreted by the semantic grammar, in one embodiment the interpretation returns a NULL value or other value signifying that the natural language expression could not be interpreted by the semantic grammar; in another embodiment, the failure of a semantic grammar to interpret an expression does not result in any return value, but instead in a failure to complete parsing and interpretation.

An expression pattern 408A corresponds to one of the ways of describing the right-hand side of a context-free grammar rule, such as (BNF) Backus-Naur Form or EBNF (Extended Backus-Naur Form), or a regular expression, or a finite state automaton (FSA), or the like. The expression pattern 408A may be specified in terms of other semantic grammars, thereby allowing for hierarchical relationships between semantic grammars, and possibly the parsing of recursive expressions. The programming actions 408B may be used to assign values to the output variables 408C based on the natural language request that the semantic grammar 406 interprets.

In one embodiment, the programming language is a general-purpose procedural programming language that is extended with additional programming constructs for specifying natural language interpretation, such as the patterns 408A of the expressions to be matched. In one embodiment, the semantic grammars 406 are defined by an extended procedural programming language based on C++ in which "interpret" blocks define the expression pattern 408A to be matched, the semantic grammar parameter list defines the output variables 408C, and standard C++ statements define the programming actions 408B. It is appreciated that languages other than C++ could equally be used in other embodiments.

In one embodiment a semantic grammar 406 is implemented by a 'code block' with the general form "block outputVariablesList blockName (pattern programmingAction)+", where "outputVariablesList" is the output variables 408C, "blockName" is the given name of the block that implements the semantic grammar 406, and each pair of a "pattern" expression 408A and a "programmingAction" 408B represents a particular action to be taken in response to the existence of a particular corresponding pattern. The expression (pattern programmingAction)+ indicates that there are one or more pairings of a pattern with a programming action. One simple, concrete example of the use of this extended procedural programming language follows in Listing 2, below:

---

Listing 2

```
extern block (int totalPoints) TENNIS_POINTS( ) {
  interpret {
    (["what is" | 10 "tell me"] . ["the"] . "number of
    points played when announcer says" .
    n1 = VALID_TENNIS_NUMBER( ) . ["to"] .
    n2 = VALID_TENNIS_NUMBER( ))
  } as {
    totalPoints = (Points(n1-+>count) + Points(n2->count));
  }
}
static block (int count) VALID_TENNIS_NUMBER( ) {
  interpret {
    n_love = LOVE( ) | n = INTEGER_COUNT()
  } as {
    if (n_love) {count = 0;}
    else {
      if ( (n->count != 15) && (n->count != 30) && (n-
      >count != 40) ) {excludethis( );}
      else {count = n->count;}
    }
  }
}
static block ( ) LOVE( ) {
  interpret {
    ( "love" | "zero" )
```

-continued

Listing 2

```
    } as { }
}
int Points (int score) {
    switch (score) {
        case 0: return 0; break;
        case 15: return 1; break;
        case 30: return 2; break;
        case 40: return 3; break;
        default: return -1;
    }
}
```

In the above example, the semantic grammar 406 named TENNIS_POINTS( ) is able to interpret an expression embodying a request to determine how many points have been played in a game based on the game score in a tennis match, with the meaning of the expression represented by output variables 408C in the parameter list (namely, the integer "totalPoints"). The expression pattern 408A (["what is" 10 "tell me" ] ["the" ]. "number of points played when announcer says" n1=VALID_TENNIS_NUMBER( ). ["to" ]. n2=VALID_TENNIS_NUMBER( ))

defines a set of possible expressions that a user may input (either in text or speech) to request the current number of points so far in a tennis game. The expressions optionally begin with either the phrase "what is" or "tell me", optionally followed by the word "the", followed by the phrase "number of points played when announcer says", followed by two numbers that are valid in tennis and that are optionally separated by the word "to". Note that by constructing a more flexible expression pattern 308A for expressions in the domain of interest-one that includes a greater range of alternative forms of expression-a developer can create a "broader spectrum" request interpretation system for users.

The numbers that are valid in tennis are in turn represented by their own semantic grammars 406 named "VALID_TENNIS_NUMBER" and which accepts the scores 15, 30, 40, or "love". Thus, the expression pattern 408A of this example semantic grammar can interpret the expression "what is the score when announcer says fifteen love" (in which case its meaning is represented by the value 1 for the totalPoints output variable), but not "what is the score when announcer says fifteen eighty" because the former expression can be successfully parsed according to the expression pattern 408A, but the latter expression cannot (because "eighty" is not a valid tennis number).

Note that the semantic grammar INTEGER_COUNT( ) is not defined in Listing 2, but (for example) is provided by a separate developer and submitted for inclusion in the domain knowledge data 102 for use by others, such as the author of the TENNIS_POINTS( ) semantic grammar of Listing 2.

Note also that the programming actions 408B may accomplish different types of purposes. For example, the programming actions 408B of the block TENNIS_POINTS( ) (i.e., the code "totalPoints=(Points (n1->count)+Points (n2->count));") simply converts the given two scores to point values and sums them, whereas the programming actions 408B of the VALID_TENNIS_NUMBER( ) block (i.e. the code beginning with "if (n_love) {count=0;}") specifies the semantic constraint that the score be "15", "30", or "40"; if this semantic constraint is not satisfied, the excludethis( ) function will be called to abort the parse as unsuccessful.

The above example of Listing 2 is a simple example explaining the different aspects of a semantic grammar 406 in the context of a particular example problem. Note that another use of the actions 408B of the semantic grammars 406 is the generation of request packages. For example, as one or more semantic grammars 406 successful parse a given user command, their corresponding actions 408B can generate the response packages to be provided to the client devices 110.

In the same way, semantic grammars 406 could also be created for other purposes, such as specifying commands like the above example cancellation of a calendar appointment. For example, a developer of the application 111 that includes a command for canceling a calendar appointment could author a top-level semantic grammar 406 for handling user requests for the command. One or more semantic grammars 406 and their rules 408 would specify the different manners in which a user could indicate a request for the command, and the command specifics, using natural language. For example, different patterns 408A could accept different forms of a request, such as "Cancel my meeting with Chris tomorrow at 2 pm", "Delete appointment tomorrow at 1400", "Remove meeting with Chris on June 21st", and the like. Similarly, the actions 408B of the semantic grammar 406 could result in the generation of the particular response package that has a format corresponding to the command, as specified by the schema for that command (e.g., one response for client devices 110 that don't support the feature, one response for successful cancellation of the appointment, one response for non-existence of the reference appointment, etc.) and that has the values specified by the command request (e.g., "June $21^{st}$" as the appointment day, "2 pm" as the appointment time, etc.).

The response-processing server 100 comprises parsing logic 402 that takes a natural language request as input and determines whether a given semantic grammar 406 can interpret that query and if so (optionally) a match strength measure between the given semantic grammar and the expression. A semantic grammar 406 is considered to be able to interpret a natural language request if the request can be parsed according to the semantic grammar's pattern 408A and satisfies the semantic grammar's semantic constraints (if any).

The parsing logic 402 has a meaning parser module 403 that accepts textual input for a natural language request and determines whether a given semantic grammar 406 can interpret that textual input.

In one embodiment, the parsing logic 402 also has a weighting module 404 that assigns values to successful interpretations of an expression as a way to rank the relative strength of the successful interpretations. Specifically, the weighting module 404 computes a match strength measure corresponding to a measure of strength of a parse obtained by a semantic grammar 406 parsing the given request, such as the estimated likelihood that the parse produces the request. The match strength measure is determined as a function of weights assigned to sub-expressions within the given expression that ultimately matches the input. In one embodiment, the weights of sub-expressions represent likelihoods of the sub-expressions, and the weight of the matching expression is calculated as the product of the weights of the sub-expressions. For instance, referring to the above code example of Listing 1, the expression pattern 408A for the TENNIS_POINTS semantic grammar is composed of sub-expressions such as "what is", "tell me", "the", "number of points when announcer says", VALID_TENNIS_NUMBER( ) (a separate semantic grammar), and "to". In the disjunction for the optional sub-expression ["what is" 10 "tell me"], the value 10 serves as a weight corresponding to the sub-expression "tell me". This causes the weighting module 404 to assign a likelihood value of 1/(1+10)=1/11 to the alternative "what is", and 10/(1+10)=10/11 to the alternative "tell me", reflecting an expectation that a user will be 10 times as likely to say "tell me" as the user would be to say "what is" when expressing a request for a tennis score. Accordingly, expressions that are interpreted by the TENNIS_POINTS( ) semantic grammar 406 and that begin with "tell me" will obtain higher match strength (0.9090) measures than those that match but begin with "what is" (0.0909).

In one embodiment, the parsing logic 402 implements the grammar application module 205 of FIG. 2. That is, when a particular command request is received by the response-processing server 100 from a client device 110, the parsing logic 402 tests and weights some or all of the stored semantic grammars 406 against the received command request, selecting the semantic grammar producing the highest-score as the semantic grammar to use when handling the command request.

In one embodiment, the response-processing server 100 includes a schema repository 420 storing the package schemas 420 that correspond to the different commands/semantic grammars 406. As noted above, the schemas 420 may be provided by the developers 201 of FIG. 2, for example. The package schemas describe the structure that a response package for a particular command must have. In one embodiment, a schema compiler 421 compiles the schemas 420 to produce corresponding response package interface code 422. The response package interface code 422 includes procedural code for creating data structures embodying the corresponding response package, for getting and setting fields of those data structures, and for serializing and deserializing those data structures when transmitting the data structures over the network 140 between the server 100 and the client devices 110.

Example Interaction Sequence

Figure 5:
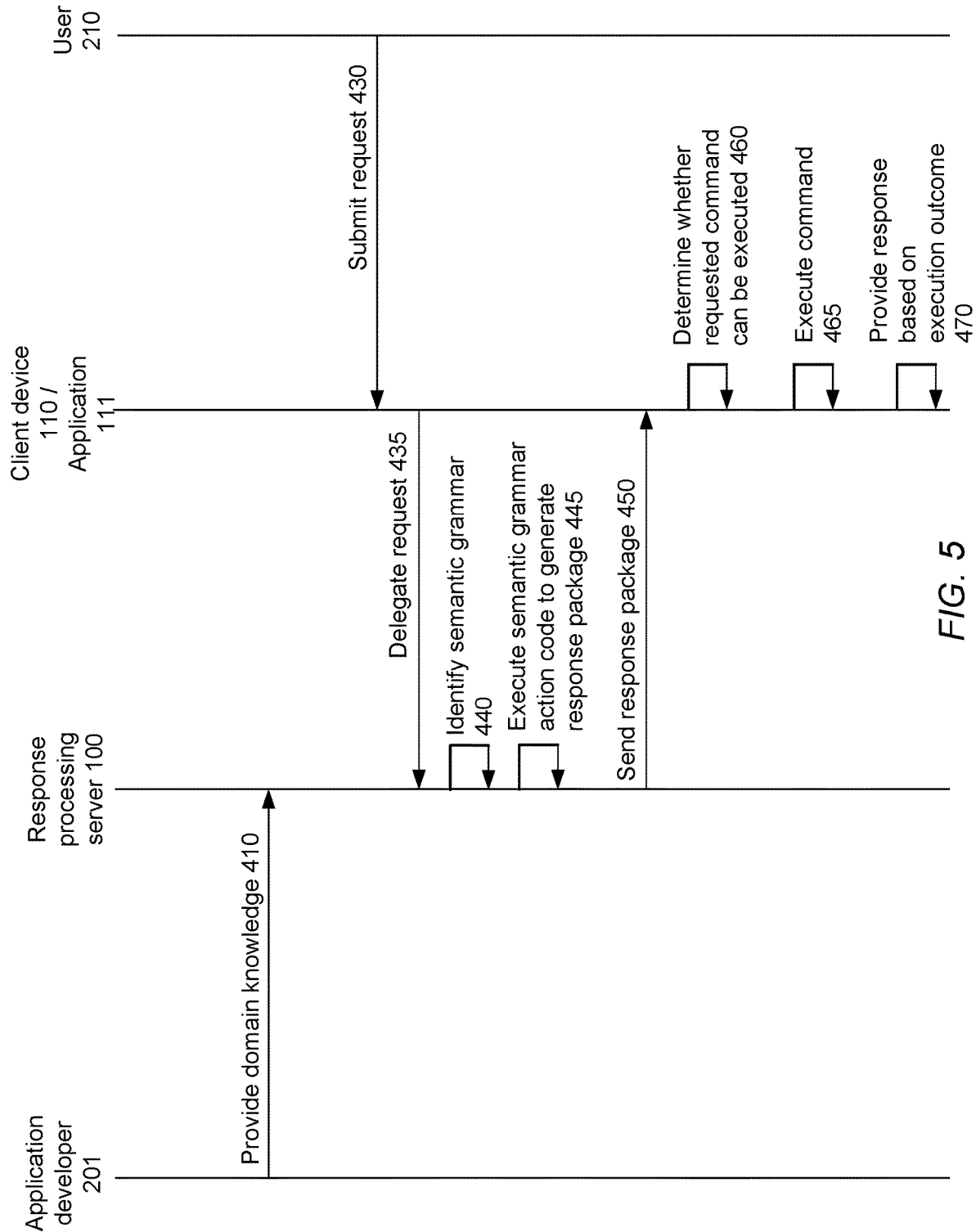
FIG. 5 is a sequence diagram illustrating interactions between the different entities of FIGS. 1 and 2, according to one embodiment.

FIG. 5 is a sequence diagram illustrating interactions between the different entities of FIGS. 1 and 2, according to one embodiment.

An application developer 201 provides 410 domain knowledge data to the response processing server 100, for each command of the application for which the application developer 201 wishes to use the response-processing server 100 for command interpretation. The domain knowledge includes, for each command, a semantic grammar 406 and (optionally) a package schema 420. The domain knowledge may also be provided by a developer separate from the developer that authored the application 111 itself. In such cases, the separate developer also provides code for the response selector 212 of FIG. 2.

A user submits 430 a command request on the user's client device 110 (e.g., as spoken or typed natural language), and the client device 110 delegates 435 the request to the response-processing server 100. The response-processing server 100 identifies 440 a semantic grammar for the command request. The parsing logic 402 of FIG. 4, which parses and weights the command request using each of the semantic grammars 406 in the domain knowledge data and selecting the semantic grammar that produces the highest score, is one example of a means of performing this function. With a semantic grammar 406 for the command request identified, the response-processing server executes 445 the action code 408B of the semantic grammar, and the action code generates a response package for the command. The response package builder 206 of FIG. 2 (e.g., as implemented by the executing action code 408B) is one example of a means of performing the function of generating the response package. In one embodiment, the action code 408B generates the response package by identifying and applying a package schema 420 that corresponds to the identified semantic grammar, e.g., by calling the response package interface code 422 previously generated by the schema compiler 421.

With the response package generated, the response-processing server 100 sends 450 the response package for delivery to the client device 110.

When the client device 110 receives the response package, the response selector 212 for the application 111—which is one example of a means of performing the function of selecting an appropriate response and executing the command—determines 460 whether it can execute the command. The response selector 212 may determine that the command is not executable by reading a field from the response package, e.g., the value of the "CommandKind" field, such as "CalendarCommand" and determining that it is not one of the commands that the client device 110 and/or the application 111 can support. For the example of Listing 1, the particular application 111 implemented on the client device 110 might not support the "CalendarCommand" command type, or its specific sub-type "CancelItem" indicated by the "CalendarCommandKind" field. The response selector 212 may also determine that the command is not executable based on the state of the application data, e.g., that the appointment for which cancellation is requested doesn't exist, or the state of the application itself, as indicated by the required input states, if any, specified by the various possible responses of the response package.

If the command can be executed, then the response selector 212 executes 465 the command, to the extent that the command can be successfully executed. The response selector 212 identifies which of the potential responses of the response package is appropriate and provides 470 an appropriate indication of the outcome of the command using the identified response, such as displaying textually a value from identified response in the response package (e.g., in the case of appointment cancellation success, the sub-value "I've canceled that item on your calendar" of the "ClientActionSucceededResult" value from Listing 1), speaking a value of the identified response from the response package using text to speech technology, or the like. The response selector 212 may choose the indication of the outcome of the command according to a view type attribute of the response package, determining which is the "best" of the indicated view types that the client device 110 can successfully provide. The response selector 212 may also set a state of the application 111 based on the output state (if any) specified by the selected response from the response package.

Example Computer Architecture

Figure 6:
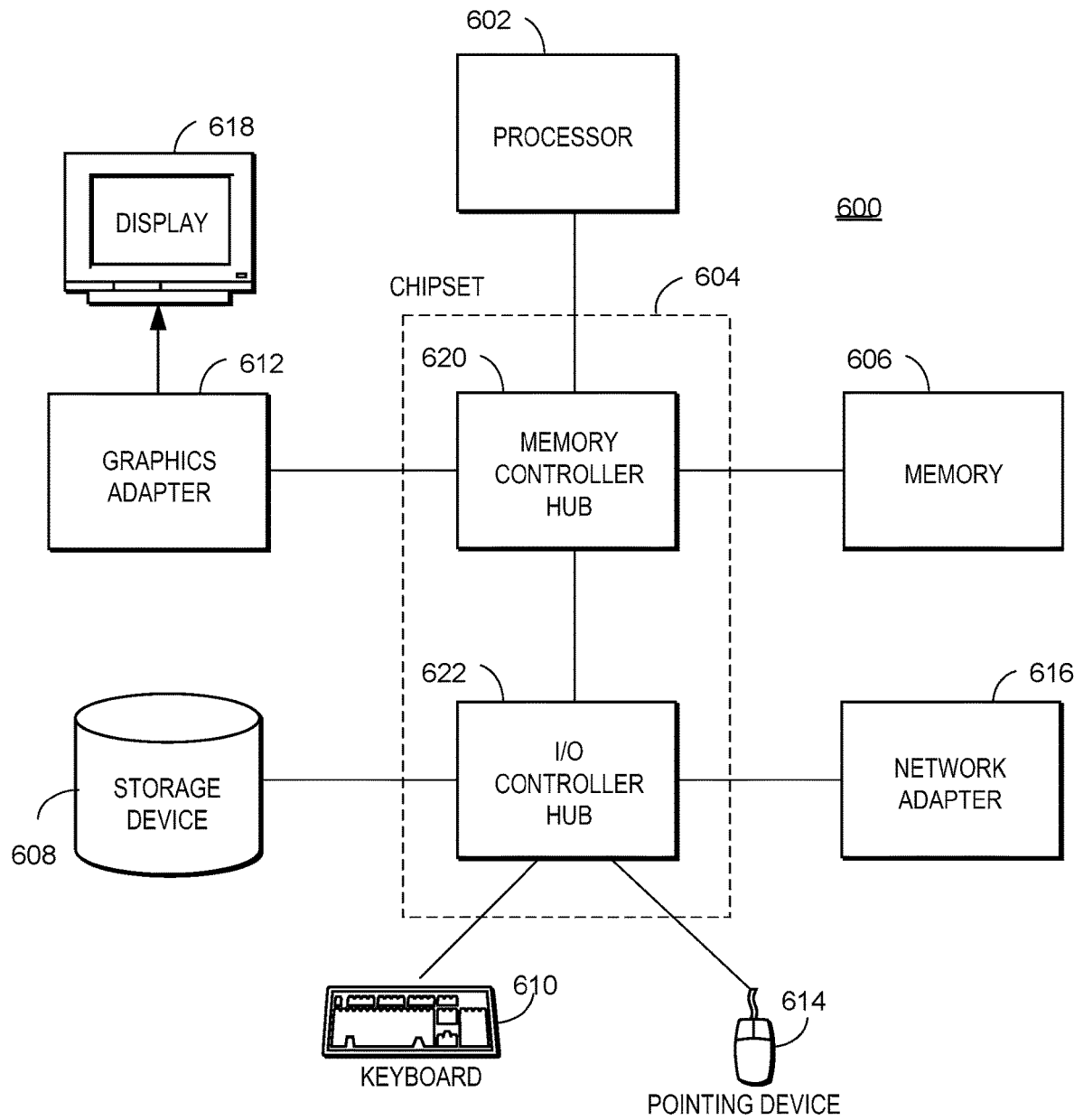
FIG. 6 is a high-level block diagram illustrating physical components of a computer used as part or all of the query-processing server, client device, or developer host from FIG. 1, according to one embodiment.

FIG. 6 is a high-level block diagram illustrating physical components of a computer 600 used as part or all of the query-processing server 100 or client device 110, or developer host 120 from FIG. 1, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims below.

Appendix 1. Response Package for Command Request "Cancel My Meeting with Chris Tomorrow at 2 pm"

```
{
    "CommandKind": "CalendarCommand",
    "SpokenResponse": "Canceling a calendar item is not supported by this client.",
    "SpokenResponseLong": "Canceling a calendar item is not supported by this client.",
    "WrittenResponse": "Canceling a calendar item is not supported by this client.",
    "WrittenResponseLong": "Canceling a calendar item is not supported by this client.",
    "AutoListen": false,
    "ViewType": [
        "Native"
    ],
    "ClientActionSucceededResult": {
        "SpokenResponse": "I've canceled that item on your calendar.",
        "SpokenResponseLong": "I've canceled that item on your calendar.",
        "WrittenResponse": "I've canceled that item on your calendar.",
        "WrittenResponseLong": "I've canceled that item on your calendar.",
    },
    "ClientActionFailedResult": {
        "SpokenResponse": "That calendar item cancelation could not be made.",
        "SpokenResponseLong": "That calendar item cancelation could not be made.",
        "WrittenResponse": "That calendar item cancelation could not be made.",
        "WrittenResponseLong": "That calendar item cancelation could not be made.",
    },
    "CalendarCommandKind": "CancelItem",
    "Query": {
        "SelectionTarget": "First",
        "RecurringTarget": "SpecifiedOnly",
        "ItemType": "Meeting",
        "StartTimeRange": {
            "RangeStart": {
                "Date": {
                    "Symbolic": "unknown"
                },
                "Time": {
                    "Hour": 14,
                    "AmPmUnknown": false,
                    "Minute": 0,
                    "Second": 0,
                }
            },
            "RangeEnd": {
                "Date": {
                    "Symbolic": "unknown"
                },
                "Time": {
                    "Hour": 14,
                    "AmPmUnknown": false,
                    "Minute": 0,
                    "Second": 0,
                }
            }
        }
    },
    "NativeDate": {
        "Query": {
            "SelectionTarget": "First",
            "RecurringTarget": "SpecifiedOnly",
            "ItemType": "Meeting",
            "StartTimeRange": {
                "RangeStart": {
                    "Date": {
                        "Symbolic": "unknown"
                    },
                    "Time": {
                        "Hour": 14,
                        "AmPmUnknown": false,
```

-continued

```
            "Minute": 0,
            "Second": 0,
          }
        },
        "RangeEnd": {
          "Date": {
            "Symbolic": "unknown"
          },
          "Time": {
            "Hour": 14,
            "AmPmUnknown": false,
            "Minute": 0,
            "Second": 0,
          }
        }
      }
    },
    "ClientPreferenceIsNotSetResult": {
      "SpokenResponse": "Calendar items cannot currently be
canceled because no preferred calendar has been chosen.",
      "SpokenResponseLong": "Calendar items cannot currently be
canceled because no preferred calendar has been chosen.",
      "WrittenResponse": "Calendar items cannot currently be
canceled because no preferred calendar has been chosen.",
      "WrittenResponseLong": "Calendar items cannot currently be
canceled because no preferred calendar has been chosen.",
    },
    "NoMatchResult": {
      "SpokenResponse": "No matching calendar item was found.",
      "SpokenResponseLong": "No matching calendar item was found.",
      "WrittenResponse": "No matching calendar item was found.",
      "WrittenResponseLong": "No matching calendar item was found.",
    }
}
```

Appendix 2. Response Package for Command Request "Dial 123 456 7890"

```
{
    "CommandKind": "PhoneCommand",
    "SpokenResponse": "Placing phone calls is not supported by this
client.",
    "SpokenResponseLong": "Placing phone calls is not supported by
this client.",
    "WrittenResponse": "Placing phone calls is not supported by this
client.",
    "WrittenResponseLong": "Placing phone calls is not supported by
this client.",
    "AutoListen": false,
    "ViewType":
        "Native",
        "None"
    ],
    "ClientActionSucceededResult": {
        "SpokenResponse": "Calling one two three four five six
seven eight nine zero",
        "SpokenResponseLong": "Calling one two three four five
six seven eight nine zero",
        "WrittenResponse": "Calling 1234567890.",
        "WrittenResponseLong": "Calling 1234567890."
    },
    "ClientActionFailedResult": {
        "SpokenResponse": "Failed trying to call one two three four
five six seven eight nine zero",
        "SpokenResponseLong": "Failed trying to call one two
three
    four five six seven eight nine zero",
        "WrittenResponse": "Failed trying to call 1234567890.",
        "WrittenResponseLong": "Failed trying to call
1234567890."
    {,
    "PhoneCommandKind": "CallNumber",
    "Number": "1234567890",
    "NativeData": {
        "Number": "1234567890"
    }
}
```

Appendix 3. Response Package for Command Request "Set an Alarm for 6 am"

```
{
    "CommandKind": "AlarmCommand",
    "SpokenResponse": "This client does not support setting an alarm.",
    "SpokenResponseLong": "This client does not support setting an
alarm.",
    "WrittenResponse": "This client does not support setting an alarm.",
    "WrittenResponseLong": "This client does not support setting an
alarm.",
    "AutoListen": false,
    "ConversationState": {
        "ConversationStateTime": 1431126349,
        "CommandKind": "AlarmCommand",
        "AlarmCommandKind": "AlarmSetCommand"
    },
    "ViewType": [
        "Native",
        "None"
    ],
    "ClientActionSucceededResult": {
        "SpokenResponse": "Setting the alarm for 6 a m.",
        "SpokenResponseLong": "Setting the alarm for 6 a m.",
        "WrittenResponse": "Setting the alarm for 6:00 am.",
        "WrittenResponseLong": "Setting the alarm for 6:00 am.",
        "ConversationState": {
            "ConversationStateTime": 1431126349,
            "CommandKind": "AlarmCommand",
            "AlarmCommandKind": "AlarmSetCommand"
        }
    },
    "ClientActionFailedResult": {
        "SpokenResponse": "The alarm could not be created.",
        "SpokenResponseLong": "The alarm could not be created.",
        "WrittenResponse": "The alarm could not be created.",
        "WrittenResponseLong": "The alarm could not be created."
    },
    "AlarmCommandKind": "AlarmSetCommand",
    "NativeData": {
        "Alarms": [
            {
                "Hour": 6,
                "Minute": 0,
                "DaysOfWeek": [ ],
                "InvalidDates": [ ]
            }
        ]
    }
}
```

Appendix 4: Response Package for Command Request "Set an Alarm"

```
{
    "Format": "SoundHoundVoiceSearchResult",
    "FormatVersion": "1.0",
    "Status": "OK",
    "NumToReturn": 1,
    "AllResults": [
        {
            "CommandKind": "AlarmCommand",
            "SpokenResponse": "This client does not support setting an
alarm.",
            "SpokenResponseLong": "This client does not support setting an
alarm.",
```

-continued

```
    "WrittenResponse": "This client does not support setting an
alarm.",
    "WrittenResponseLong": "This client does not support setting
an alarm.",
    "AutoListen": false,
    "ConversationState": {
        "ConversationStateTime": 1431127801,
        "CommandKind": "AlarmCommand",
        "AlarmCommandKind": "AlarmStartCommand",
        "Mode": "Default"
    },
    "ViewType": [
        "Native",
        "None"
    ],
    "RequiredFeatures":[
        "AlarmSet"
    ],
    "RequiredFeaturesSupportedResult": {
        "SpokenResponse": "What time should the alarm go off?",
        "SpokenResponseLong": "What time should the alarm go
off?",
        "WrittenResponse": "What time should the alarm go
off?",
        "WrittenResponseLong": "What time should the alarm go
off?",
        "AutoListen": true,
        "ConversationState": {
            "ConversationStateTime": 1431127801,
            "Mode": "Alarm",
            "CommandKind": "AlarmCommand",
            "AlarmCommandKind": "AlarmStartCommand"
        }
    },
    "AlarmCommandKind": "AlarmStartCommand",
    "NativeData": { }
    }
],
"Disambiguation": {
    "NumToShow": 1,
    "ChoiceData": [
        {
            "Transcription": "set an alarm",
            "ConfidenceScore": 1
        }
    ]
},
"ResultsAreFinal": [
    true
],
"BuildInfo": {
    "User": "knightly",
    "Date": "Fri May 8 13:10:36 PDT 2015",
    "Machine": "s10766724502414.pnp.melodis.com",
    "SVNRevision": "23020",
    "SVNBranch": "dev_multi_machine",
    "BuildNumber": "1438",
    "Kind": "Low Fat",
    "Variant": "release"
},
"ServerGeneratedId": "925dae85-f746-4821-bf37-c1ec3a3d3fd4"
}
```

What is claimed is:

1. A computer-implemented method performed by a server, the method comprising:
    receiving, for a first application and for a second application of a plurality of different applications in different domains, from developers of the applications:
        a semantic grammar describing valid natural language commands for the application, and
        a response schema describing a format for a response package corresponding to the application, the response package including a plurality of different conditional responses to valid natural language commands that client devices select depending on a state of data of the application, wherein the format specifies different applicability criteria for the different conditional responses,
    wherein the response schema for the first application is different from the response schema for the second application;
    receiving a first natural language command and a second natural language command from a client device;
    determining that the semantic grammar of the first application can interpret the first natural language command and that and the semantic grammar of the second application can interpret the second natural language command;
    responsive to determining that the semantic grammar of the first application can interpret the first natural language command, generating a first response package conforming to the response package format of the response schema of the first application and including a first plurality of different conditional responses of the client device and a first ordered set of view types which specify configurations for displaying the different conditional responses, wherein lower ordered view types are used responsive to the client device not being capable of providing higher ordered view types;
    responsive to determining that the semantic grammar of the second application can interpret the second natural language command, generating a second response package conforming to the response package format of the response schema of the second application and including a second plurality of different conditional responses of the client device and a second ordered set of view types which specify configurations for displaying the different conditional responses, wherein lower ordered view types are used responsive to the client device not being capable of providing higher ordered view types,
    wherein the first response package is different from the second response package; and
    providing the first response package and the second response package to the client device for execution.

2. The computer-implemented method of claim 1, wherein the first response package comprises command parameter values derived from the first natural language command and aiding the client device in executing the natural language command.

3. The computer-implemented method of claim 1, wherein the semantic grammar and the response schema are received over a network from an application developer located remotely from the server.

4. The computer-implemented method of claim 1, wherein the first response package is formatted to allow the client device to choose a conditional response responsive to multiple steps of determination.

5. A non-transitory computer-readable storage medium comprising instructions of an application that when executed by a processor of a client device perform actions comprising:
    sending a natural language command for delivery to a server;
    receiving from the server a response package containing a plurality of conditional responses to the natural language command and an ordered set of view types which specify configurations for displaying the conditional responses, wherein lower ordered view types are used responsive to the client device not being capable of providing higher ordered view types;

determining, using at least data of the response package, whether the application of the client device can execute a first one of the plurality of conditional responses on the client device;

responsive to determining that the application can execute the first one of the plurality of conditional responses:
identifying a response string specified within the response package based on at least one of whether the client device has a display, and whether the client device has a text-to-speech module, and
outputting the response string in a manner corresponding to the response string; and responsive to determining that the application cannot execute the first one of the plurality of conditional responses:
identifying a default response within the response package, and
displaying the default response.

6. The non-transitory computer-readable storage medium of claim 5, the actions further comprising displaying the conditional response in a manner based on the view types that the client device supports.

7. The non-transitory computer-readable storage medium of claim 5, wherein executing the conditional response comprises:
identifying, within the response package, command parameter values; and
executing the conditional response using the identified command parameter values.

8. The non-transitory computer-readable storage medium of claim 5, the actions further comprising:
identifying response text specified in the first one of the conditional responses; and
displaying the identified response text.

9. The non-transitory computer-readable storage medium of claim 5, wherein the response package is formatted to allow the client device to choose a conditional response responsive to multiple steps of determination.

10. The non-transitory computer-readable storage medium of claim 5, wherein identifying a response string specified within the response package based on at least one of whether the client device has a display, and whether the client device has a text-to-speech module, is based on whether the client device has a display.

11. The non-transitory computer-readable storage medium of claim 5, wherein identifying a response string specified within the response package based on at least one of whether the client device has a display, and whether the client device has a text-to-speech module, is based on whether the client device has a text-to-speech module.

12. A computer-implemented method for providing appropriate responses to different types of user interfaces, the method comprising:
receiving a first request from a first client of a first type;
generating a first response package for the first request, the first response package having a first conditional response, a second conditional response, and a first ordered set of view types which specify configurations for displaying conditional responses, wherein lower ordered view types are used responsive to clients not being capable of providing higher ordered view types;
transmitting the first response package to the first client;
receiving a second request from a second client of a second type;
generating, in response to the second request, a second response package including the first conditional response, the second conditional response, and a second ordered set of view types which specify configurations for displaying conditional responses, wherein lower ordered view types are used responsive to clients not being capable of providing higher ordered view types; and
transmitting the second response package to the second client;
wherein the first client, because it is of the first type, uses the first conditional response to perform a first command and the second client, because it is of the second type, uses the second conditional response to perform a second command;
receiving a second request from an application of a second client;
generating a second response package for the second request, the second response package being different from the first response package.

13. The computer-implemented method of claim 12, wherein the first request comprises a natural language command, and wherein the first response package comprises command parameter values derived from the natural language command and aiding the client device in executing the natural language command.

14. The computer-implemented method of claim 12, wherein the first response package is formatted to allow the first client to choose a conditional response responsive to multiple steps of determination.

15. A computer-implemented method comprising:
providing, to a server by an application developer, domain knowledge data for an application, the domain knowledge data comprising:
a semantic grammar describing valid natural language commands for the application, and
a response schema describing a response package format including a plurality of different conditional responses of client devices to valid natural language commands for the application;
wherein upon receipt of a user natural language command delegated from a client device to the server, the server:
determines that the semantic grammar can interpret the natural language command;
executes action code of the semantic grammar to generate a response package conforming to the response package format and including a plurality of different conditional responses of the client device and a first ordered set of view types which specify configurations for displaying the different conditional responses, wherein lower
ordered view types are used responsive to the client device not being capable of providing higher ordered view types; and
provides the response package to the client device for execution, and
wherein upon receipt of a second user natural language command different from the user natural language command, the server determines that a second semantic grammar can interpret the second natural language command and executes action
code of the second semantic grammar to generate a second response package conforming to a second response package format corresponding to the second semantic grammar.

16. The computer-implemented method of claim 15, wherein upon receipt of the response package, the client device:

determines, using data of the response package, whether the application can execute the natural language command; and responsive to determining that the application can execute the natural language command:
  executes the natural language command;
  identifies, based at least in part on a result of the execution, an identified one of the conditional responses;
  identifies response text specified in the identified one of the conditional responses; and
  displays the identified response text.

\* \* \* \* \*